May 26, 1970 W. K. ENGEL 3,513,654
UNITARY DUAL HYDROSTATIC TRANSMISSION MOUNTING
Filed July 15, 1968 4 Sheets-Sheet 4
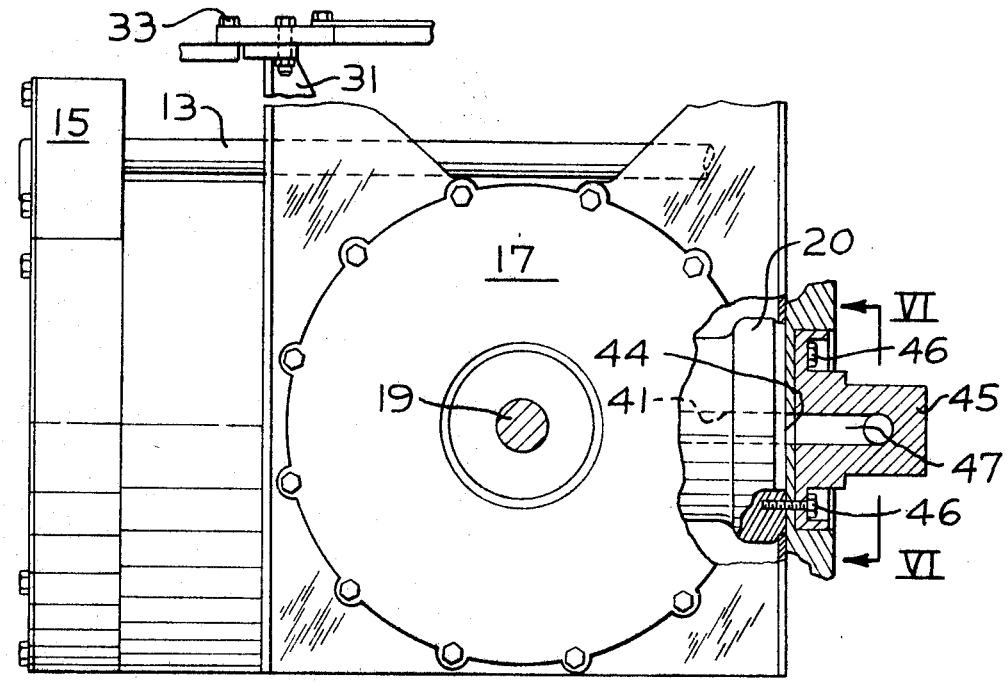
Fig.-4.
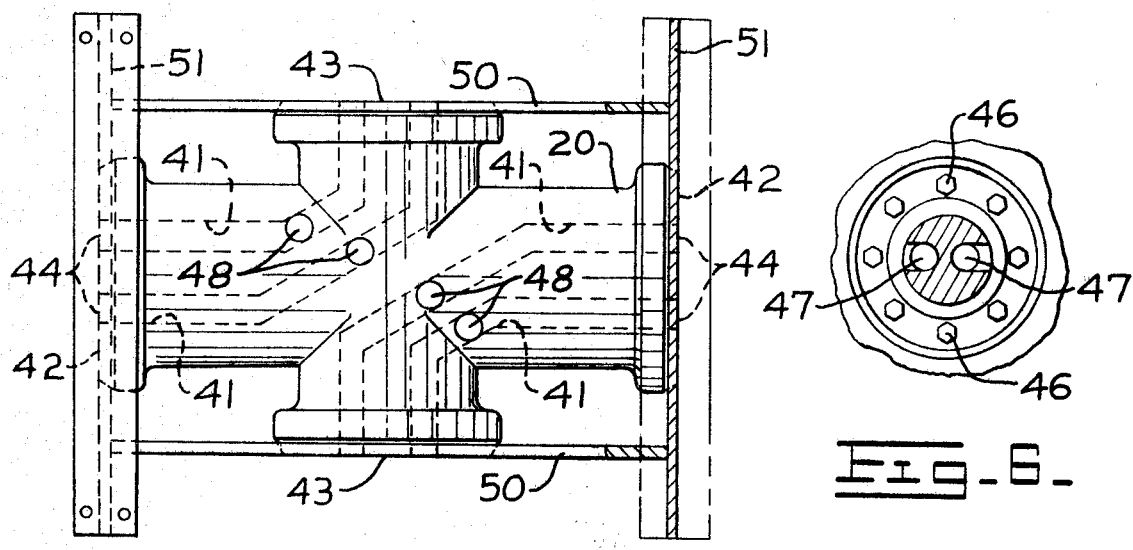
Fig.-5.
Fig.-6.
INVENTOR
WILLIAM K. ENGEL
BY
Fryer, Tjensvold, Feix, Phillips & Lempio
ATTORNEYS United States Patent Office 3,513,654
Patented May 26, 1970

3,513,654
UNITARY DUAL HYDROSTATIC
TRANSMISSION MOUNTING
William K. Engel, Peoria, Ill., assignor to Caterpillar
Tractor Co., Peoria, Ill., a corporation of California
Filed July 15, 1968, Ser. No. 744,759
Int. Cl. F16d 31/02
U.S. Cl. 60—53                                    2 Claims

ABSTRACT OF THE DISCLOSURE

When employing hydrostatic transmissions in certain types of earthmoving vehicles, two completely separate hydrostatic transmissions, one for driving tractive elements on opposite sides of the vehicle, can provide a number of complementary advantages in the vehicle. For example, in a track-type machine, such an arrangement can provide independent speed and directional control of the individual track, increasing the maneuverability and flexibility. While such an arrangement is advantageous, a number of inherent problems are present due to the high pressures in the transmissions, along with the high temperatures, which often cause distortion causing shaft mis-alignment and unwanted leakage. In addition, the two transmissions should be a compact unit to eliminate long connecting drag linkages for controlling them and to decrease the over-all size of the control system, which becomes very complex when the speed of the two transmissions are varied for steering the vehicle. In the instant invention, the above problems are solved along with collateral advantages of providing easier maintenance and improved service life of the dual transmission system by a novel mounting structure. Basically, the structure includes a central distributing manifold or block having two pairs of mutually perpendicular mounting faces and internal passages by which the ports of the mounting faces can be appropriately connected to ports in an adjacent mounting face with a hydraulic unit mounted on each mounting face and a common support means for common suspension of the fabricated structure. Also, part of the invention is a common shaft gear drive means associated with the structure for driving two of the hydraulic units simultaneously.

BACKGROUND OF THE INVENTION

Hydrostatic transmissions, as a result of their improvement, are now finding applicability in traction machinery having high drawbar horsepower requirements, since they provide an infinitely variable ratio between the engine speed and the drive train speed of the vehicle, up to the maximum speed of the transmission. In track-type tractors, it is conventional to use a pair of hydrostatic transmissions, one for driving each of the tracks on opposite sides of the machine. This arrangement affords independent control of speed and direction of the individual tracks increasing maneuverability and flexibility of the machine.

Where dual hydrostatic transmissions are employed, in such applications as described above, a number of problems arise due to the need for interrelated control systems, compact arrangement, ease of maintenance and minimizing the effects of thermal and pressure distortion within the individual transmission and relative to the rest of the vehicle in which it is mounted. In addition, proper input and output shaft orientation can manifestly improve the compactness of the design, reduce costly gearing, and minimize many of the related problems.

In particular, this invention is related to a novel mounting arrangement for radial type hydraulic units, such as those disclosed and described in U.S. Pat. No. 3,274,946 issued to Simmons. While such radial units provide a more compact hydraulic unit design, they do present the additional complications of properly arranging them to solve the above problems because of their particular configuration and drive requirements.

The instant invention provides the solution to the above problems by fabricating the dual transmissions into a single structural unit which eliminates external piping between the units and facilitates a common drive of both transmissions of a dual transmission system.

Some additional benefits are derived from improved service life, easier maintenance, lower cost and simplification in the over-all control system, especially in track-type machines.

SUMMARY OF THE INVENTION

A dual hydrostatic transmission for independently driving tractive elements on opposite sides of a traction unit can be fabricated with a central distributing manifold or block having pairs of mutually perpendicular mounting faces, a pair of ports in each mounting face connecting with similar ports in a perpendicular mounting face by separate internal passages in the manifold or block, a hydraulic unit mounted on each face with its fluid ingress and egress ports connected with the ports in its associated mounting face, said passages arranged so that hydraulic units mounted at right angles form transmissions, support means associated with hydraulic units and the manifold for suspending the structure as a unit and a common shaft gear drive means connected to simultaneously drive the hydraulic units functioning as pumps journaled in said assembled structure.

BRIEF DESCRIPTION OF THE DRAWINGS

FIG. 4 is a side elevation of the transmission structure with the front hydraulic unit broken away to show the detail of the pintle valve of the front hydraulic unit;

FIG. 5 is a top view of the distribution manifold or block; and

FIG. 6 is a sectional along line VI—VI of FIG. 4 showing the pintle valve in section.

Figure 1:
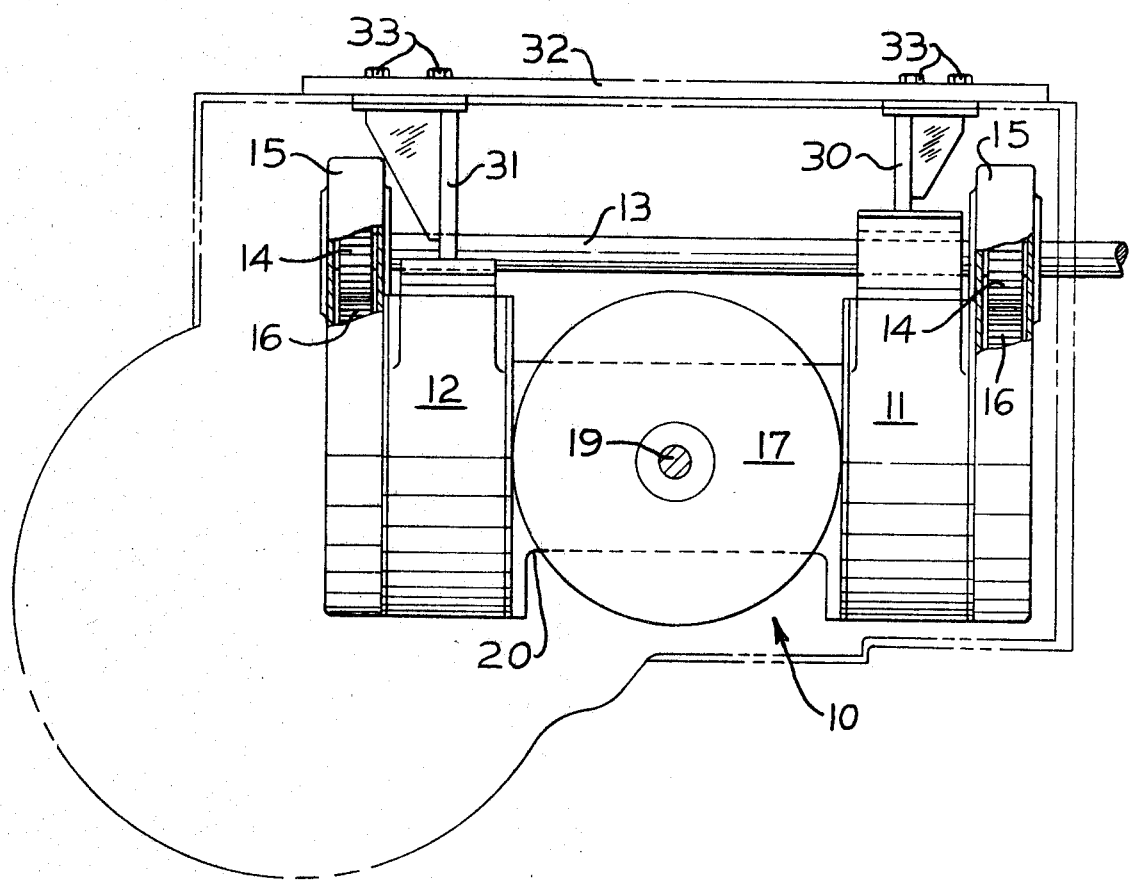
FIG. 1 is an elevation of the novel unitary dual transmission structure with broken line indicating its relationship in the rear of the vehicle.

As can be seen in FIG. 1, the hydraulic units 11 and 12, which function as pumps, are spaced apart but generally oriented similarly. In this configuration a common drive shaft 13, having two gears 14 keyed thereto, is journaled in pump shrouds 15 so the gears will drive the bull gears 16 of each pump simultaneously. A distributing manifold or block 20 provides the intermediate structure between the two pump units and the spaced apart hydraulic units 17 and 18, which function as motors, are centrally mounted on this manifold perpendicular to the pump units. So arranged, their output shafts 19 are oriented transversely in the vehicle allowing reduction gearing (not shown) to be driven directly through a convenient gear arrangement and without angle drives.

As shown in FIG. 1, the whole unit 10 is adapted to suspend from the top of the transmission case through a front support bracket 30 and a rear support bracket 31 which are attached to the top plate 32 of the transmission case with bolts 33.

Figure 2:
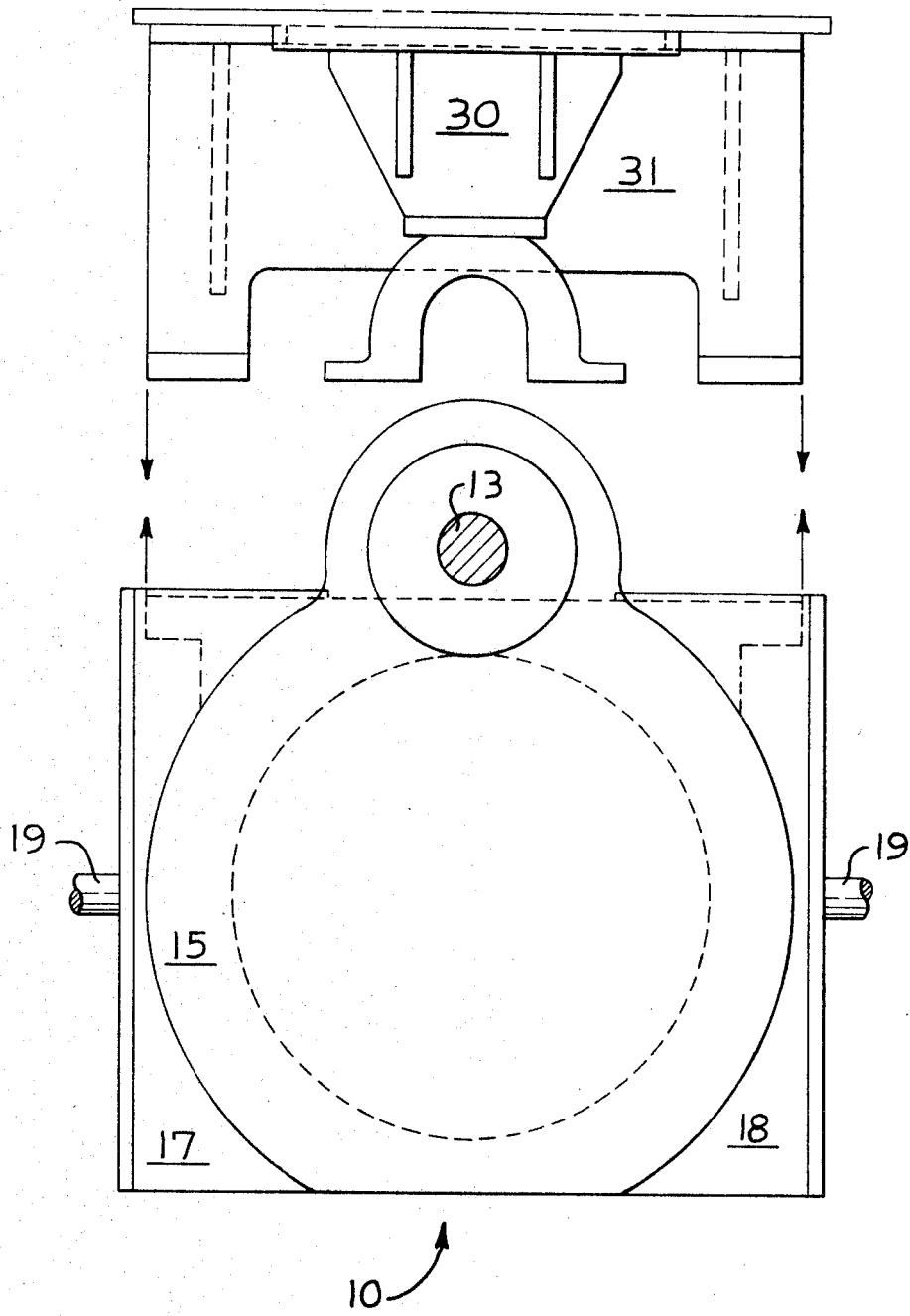
FIG. 2 is a front view of the transmission structure shown in FIG. 1 with the front and rear support members elevated from their normal position.
Figure 3:
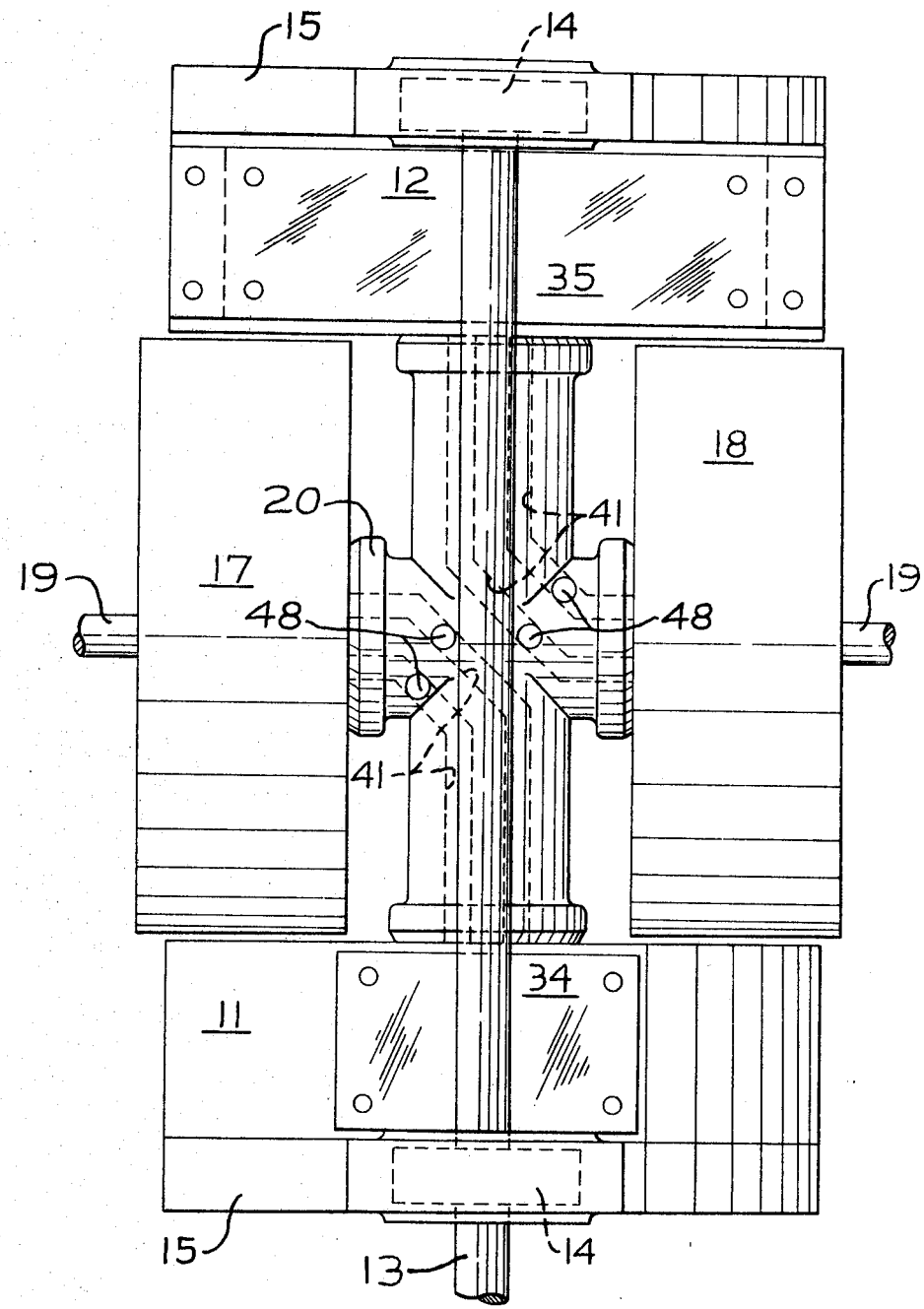
FIG. 3 is a top view of the transmission with the front and rear support members removed.

In the embodiment shown in FIGS. 2 and 3, the front support bracket 30 attaches directly to the body of the front hydraulic unit, pump 11, on a surface 34 of the front hydraulic unit and the rear support bracket attaches similarly to the somewhat wider surface 35 on the rear hydraulic unit, pump 12. Both of these support brackets include a bridge section so when they are attached to their respective pump, shaft 13 journaled in the shrouds 15 can extend beneath them through these bridge portions.

The heart of the mounting structure is the distributing manifold or block 20 which is best shown in FIG. 5. Preferably, it consists of a unitary X-shaped block which has been drilled to provide two independent internal passages 41 joining one of the pump faces 42 with a perpendicular motor mounting face 43. The longer arms of the X-shaped block on which the pump mounting faces are located, are somewhat longer than those on which the motor mounting faces are fixed in order to provide a more compact structure and allow the radial motor units to fit between the respective pump units.

In each mounting face, there are two ports 44, one for each of the internal passages leading to that mounting face, so that when a pintle valve 45 is secured to a mounting face with bolts 46, each passage 47 in the pintle valve will register with a port in the mounting face, (see FIGS 4, 5 and 6).

The integral mounting of the four hydraulic units on a single manifold block, as described above, minimizes thermal distortions and sharply reduces the leakage that would otherwise be present in units connected by individual conduits.

In FIG. 5, a tapped bore 48 is shown connecting with each internal passage within the block 20, so that the appropriate relief and replenishing valves can communicate with the respective passages in the fluid loops of each of the dual transmissions. Similar tapped bores are provided on the bottom side of the blocks so that dual functions need not be accomplished through the same tap. Further, the use of this central distributing block or manifold allows the control system to be easily attached to the transmissions as well as, in some cases, a common function to be carried out in the relief and replenishing system and the associated valves.

For added strength, the block 20 can be boxed in with plates 50 and 51 which can be welded directly to the block to form structure shown in FIG. 5. Welding these plates to the block 20 also provides a convenient mounting arrangement for the auxiliary control systems and relief and replenishing valve groups.

From the drawings, it can be seen that the current arrangement provides an extremely compact and functional transmission by which a large number of advantages are obtained.

What is claimed is:

1. A compact integral dual transmission system with two separate hydrostatic power loops each with a variable displacement pump joined in a single assembly comprising:

a unitary X-shaped manifold means having a long axis and a short axis which are mutually perpendicular to one another;

two variable displacement radial hydrostatic units mounted on opposite sides of said manifold on its long axis and normal thereto;

two radial hydrostatic units mounted on opposite sides of said manifold means on its short axis and normal thereto;

a plurality of passage means in said manifold means separately connecting each radial hydrostatic unit mounted on the long axis of said manifold means with a radial hydrostatic unit mounted on the short axis of said manifold means so that two separate hydrostatic power loops are formed; and a cross shaft journalled on the assembly having its axis parallel with one of the perpendicular axis of said manifold, said cross shaft drivingly connected with two of said radial hydrostatic units mounted normal to its parallel axis on opposite sides of said manifold means whereby said two radial hydrostatic units are driven as pumps through said cross shaft and the remaining two radial hydrostatic units can be driven by pressurized fluid flow from its associated pump.

2. The transmission system as defined in claim 1 wherein the long axis of the unitary X-shaped manifold means is of a sufficient length to prevent interference between the four radial hydrostatic units when two of the latter are assembled on said manifold means on its short axis.

References Cited

UNITED STATES PATENTS

| | | |
|---|---|---|
| 2,679,727 | 6/1954 | McLeod. |
| 3,123,975 | 3/1964 | Ebert. |
| 3,279,172 | 10/1966 | Kudo et al. _____ 60—53 |
| 3,349,860 | 10/1967 | Ross. |
| 3,411,296 | 11/1968 | Peterson. |

EDGAR W. GEOGHEGAN, Primary Examiner